United States Patent [19]

Klingbeil

[11] 4,143,415
[45] Mar. 6, 1979

[54] MULTIPLE CONTROL CIRCUIT WITH FLOATING SETPOINT

[75] Inventor: Herbert N. Klingbeil, Peterborough, Canada

[73] Assignee: Canadian General Electric Company Limited, Toronto, Canada

[21] Appl. No.: 842,926

[22] Filed: Oct. 17, 1977

[30] Foreign Application Priority Data

May 13, 1977 [CA] Canada ................................. 278398

[51] Int. Cl.² ....................... G05B 11/18; G06F 15/46
[52] U.S. Cl. .................................... 364/105; 318/592; 318/596; 318/561; 364/114; 364/118
[58] Field of Search ............... 364/100, 105, 106, 114, 364/118, 119; 318/561, 590, 591, 592, 593, 594, 595, 596, 597

[56] References Cited

U.S. PATENT DOCUMENTS

| | | | |
|---|---|---|---|
| 3,458,785 | 7/1969 | Sordello | 318/594 X |
| 3,657,524 | 4/1972 | Bakke | 364/114 X |
| 3,665,500 | 5/1972 | Lewis et al. | 318/596 |
| 3,749,997 | 7/1973 | Cohen et al. | 318/592 |
| 3,958,109 | 5/1976 | Doherty et al. | 364/114 X |
| 4,025,839 | 5/1977 | Maury | 318/592 X |

*Primary Examiner*—Joseph F. Ruggiero
*Attorney, Agent, or Firm*—Ivor J. James, Jr.; Samuel E. Turner; Sam E. Laub

[57] ABSTRACT

A process control system providing a particular control effort function is divided into a primary control effort portion having a primary controller, and a feed back from the controlled process to the primary controller, and a secondary control effort portion having a secondary controller in controlling relation therewith, and receiving its control input from the primary controller. The secondary controller is provided with limits such that it becomes saturated in operation, thereby permitting selective overriding by the primary controller, while utilizing the secondary controller and actuators the maximum practical amount. The arrangement is suitable for use with continuously variable devices or for use with on-off (bang-bang) devices. The particular embodiments illustrated are (1) a bang-bang heater system, and (2) a continuously variable fluid flow control system.

9 Claims, 15 Drawing Figures

(* LOAD DEFICIENCY TO BE MADE UP BY SECONDARY HEATERS)

MULTIPLE CONTROL CIRCUIT WITH FLOATING SETPOINT

BACKGROUND

This invention is directed to a control system, and to a method of operation thereof. In particular the system comprises a plurality of control devices and at least two controllers operating on the devices in a modulating mode.

In the operation of industrial processes it is often general practice to use a single control device to provide a desired control effort function, having a single controller connected in controlling relation therewith.

In instances where an improved degree of reliability is desired it is preferable to utilize a plurality of control devices, in order to ensure redundancy, so as to improve system availability.

Thus for a given range of required control effort, utilization of at least two control devices provides the advantages of:

- improved reliability, due to redundancy;
- a capability of utilizing smaller or standard control devices as opposed to specialty or unusually large control devices;
- the achievement of finer resolution of control in the case of on-off (bang-bang) control techniques.

SUMMARY

The present disclosure thus permits the utilization of standard devices for the more constant or base portion of the load, being therefore subject to less on-off switching, supplemented by the provision of specialized devices to provide the major portion of system modulation, being particularly adapted to withstanding the greater switching or modulation requirements necessary to effect the desired extent of load control.

Expanding upon the foregoing, a required but variable total control effort is staged (i.e. sequenced) so that a more or less fixed base portion of the control effort is provided by standard devices, operating in a steady state condition for much of the time, and supplemented by one or more designated additional devices particularly adapted to control modulation such as on-off (bang-bang) switching control to supplement the control effort to substantially the total required value. Operating in this fashion the reliability of the control devices supplying the more or less fixed base control effort is enhanced due to the reduced switching of the control devices, while the changes in loading due to on-off load variations will be of diminished amplitude, compared with prior art wherein the designated devices could not readily serve a supplemental function in circumstances requiring a variable base control effort. Also, the economics of providing control devices engineered to withstand on-off switching operation will favor such devices of small size over similar devices of larger capacity, while the variation of control effort between the "on" mode and the "off" mode will be correspondingly smaller in accordance with the relative size of the control effort component being varied. Thus the resolution of control achieved in the case of bang-bang control for a desired function output is enhanced, while the provision of redundant control devices enhances system reliability.

Thus, there is provided a method of supplying a gross control effort by controlling a plurality of control devices of a system with selective on-off switching to achieve a desired cumulative system output varying within predetermined limits, while limiting the extent of the on-off switching, comprising the steps of; providing a first generally unvarying primary output from at least one of the devices as a primary control effort, using a primary controller of the conventional setpoint type in controlling relation therewith; providing a secondary, variable control effort output component from at least one second device connected effectively in parallel with the first device; controlling the operation of at least one secondary device in on-off switched operation by means of a secondary controller having a floating setpoint characteristic; connecting an output from the primary controller in controlling relation with the secondary controller; and providing a controlling feed-back to the primary controller in response to a condition of the system responsive to a function of the control effort.

Thus, there is provided a system for selectively controlling a plurality of control devices in an on-off switching mode in order to provide a cumulative output of the devices, comprising; first control means consisting of a conventional setpoint controller having a control output connected in controlling relation with a first device means consisting of at least one device; a second device means comprising at least one device, the first device means and the second device means being connected in mutual parallel relation; second control means consisting of a floating setpoint controller connected between the output of the first control means and the control input to the second device means in controlling relation with the latter; and output sensing means responsive to a condition of the system, this condition being responsive to the control effort, having an output connected in feed-back relation with the first control means.

The system may further be provided such that a major portion of the regulating effort is channelled through a group or a selected one of a group of devices. In this manner a heavy duty device particularly adapted for switching service may be employed, or a device offering fine resolution of control effort may be selected.

The sharing of control between the first control means comprising a conventional setpoint controller and the second control means comprising a floating setpoint controller is made possible by providing the floating setpoint controller with a saturation characteristic. Thus regulation of the system is initially attempted by the second controller in response to the output of the first controller, until such time as the second controller is forced into saturation by the output of the first controller. At this juncture the first setpoint controller continues to set alone and effects necessary changes in actuation of the devices which it controls directly until such time as the change in control effort required by the system falls within the range of the floating setpoint controller, which then again becomes operative, as it becomes non-saturated.

The operating characteristics of the control means having a floating setpoint are such that the gain is somewhat less than the gain of the main control means. This is expressed in a differential relationship where:

the gain "Gain 1" of the main control means, i.e., the average slope of the control effort curve for the first or primary (conventional setpoint) control means is the first derivative of the control effort F with regard to the first controller output $X_1$, i.e. Gain 1 = $\delta \overline{F}/\delta X_1$ where "$\delta$" is an operator designating an incremental change of the given parameter;

The gain "Gain 2" of the second control means, i.e. the average slope of the control effort curve for the floating setpoint control means, is the first derivative of the control force F with regard to the second controller output $X_2$, i.e. Gain 2 = $\delta \overline{F}/\delta X_2$ Then $\delta \overline{F}/\delta X_2$ is less than $\delta \overline{F}/\delta X_1$ In addition, the secondary floating setpoint controller is provided with limits to effectively arrest the integrating action of the secondary controller when the output signal tends to exceed desired limit values.

Thus, for lower and upper limit values $L_1$ and $L_2$ the transfer function G (which typically has a value of unity, but which value may be otherwise and may include temporal i.e. time related characteristics) is related to the functions of the primary and secondary controllers as follows:

$$\frac{\delta X_2}{\delta X_1} = \left[ G \cdot \frac{K_1 \cdot S}{S} \right]_{L_1}^{L_2} \quad \text{Equation (1)}$$

where the symbols represent:
  $\delta$ incremental change of controller output
  $X_2$ —output from secondary controller (floating setpoint controller)
  $X_1$ —output from primary (conventional setpoint) controller
  G —lead-lag, lag-lead, or other temporal transfer function
  $K_1$ —gain coefficient
  so that $K_1 * C * \delta F/\delta X_2$ is greater than $\delta \overline{F}/\delta X_1$ for a prescribed range of frequencies.
  * —denotes a product
  $\delta$ —Laplace transform operator
  $L_1$, $L_2$ —limits on $X_2$ which operate in such a way that at least the portion 1/S of the above equation remains constant while $X_2$ is less than $L_1$ or when $X_2$ is greater than $L_2$.

Thus, by selecting appropriate values of the devices being controlled, with suitable values for the limits $L_1$ and $L_2$ the full output range of the secondary controller may always be traversed before the primary (setpoint) controller is changed sufficiently to reach its next action level, with the selected limit values $L_1$ and $L_2$ for the secondary controller arresting the integrating action of the secondary controller in order to provide the desired floating setpoint characteristic effect.

The foregoing disclosure has been made primarily with reference to the operation of staged on-off controls, wherein variation of a control effort by discrete or predetermined steps is effected in the fashion known as bang-bang control. However, the present system also lends itself to an improved control system of the continuously variable type, as set forth below.

In addition to disclosing a system operable with various types of devices in accordance with the invention, a particular embodiment directed to use of the system with a heat generating arrangement is shown herein as a particular exemplification of the application to a staged on-off control. It will however be understood that the present invention is not so limited, and readily lends itself to other types of output function, such as control of fluid output flow etc. Thus the system is also exemplified herein by a continuously variable flow control system.

DRAWING

Certain embodiments are described, reference being made to the accompanying drawings, wherein.

Figures 1, 2:
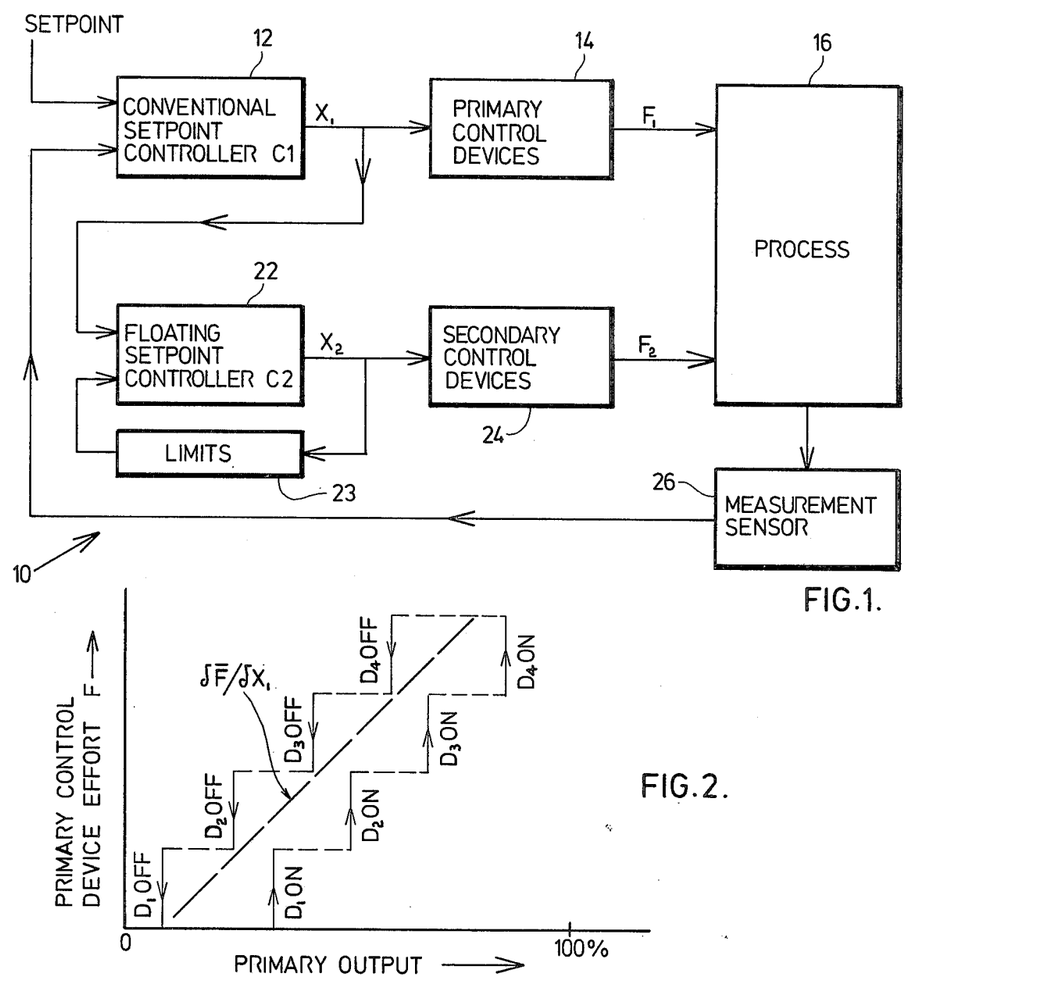
FIG. 1 is a schematic control circuit arrangement embodying the present invention, for an unstipulated process, with stages on-off control.
FIG. 2 is a characteristic control effort diagram for the conventional portion of the system of FIG. 1, operating in response to the primary controller.

Referring to FIG. 1, which illustrates the application of the present invention in the general case of a system providing an unspecified function, the system 10 has a first or primary controller 12 of the conventional setpoint type, connected in series controlling relation with a first set of primary control devices 14. The control output $X_1$ of primary controller 12 operates the devices 14 in staged control relation to produce a control effort $F_1$ from the devices 14, which provides a portion of the process output function, referred to as "process" and indicated schematically at 16.

In parallel with the primary devices are connected secondary devices 24, having a secondary controller 22 connected in controlling relation therewith, the secondary controller 22 possessing a floating setpoint characteristic. The primary controller 12 is connected to provide its output $X_1$ as an input to the secondary controller 22. The secondary controller 22 has a feed-back limit control 23, to provide the desired saturation characteristics of the secondary controller 22.

The output $X_2$ of the secondary controller 22 produces a control effort $F_2$ by the secondary devices 24, which control effort $F_2$ is cumulatively added to the control effort $F_1$ of the primary devices 14.

A measurement sensor 26 connected with the process 16 monitors the controlled function in its cumulative effect, and provides a feed-back to the first controller 12. The use of a bang-bang control is considered as being a particular case of a staged on-off control.

Referring to FIG. 2, dealing with the normal on-off or bang-bang control of a conventional setpoint controller system, with primary devices 14 comprising devices $D_1$, $D_2$, $D_3$ and $D_4$, the performance envelope of the characteristic control diagram achieved by selective switching full-on or full-off, of the respective devices $D_1$, $D_2$, $D_3$ and $D_4$ by primary controller 12, provides a control gradient $\delta \overline{F}/\delta X_1$.

Figure 3:
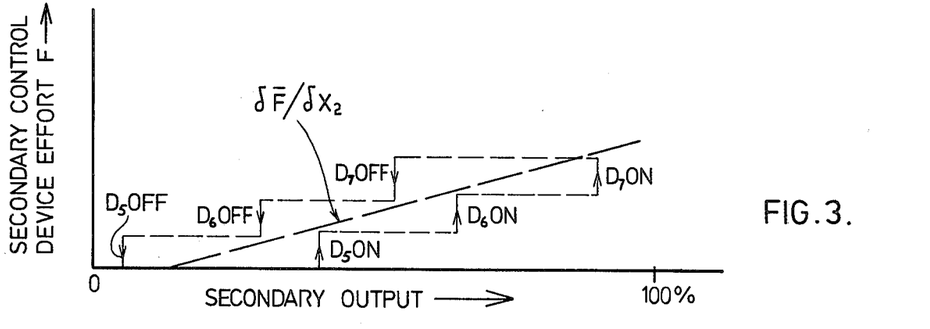
FIG. 3 is a characteristic control effort diagram for the innovative portion of the system of FIG. 1, operating in response to the secondary controller of floating setpoint characteristics.

In contrast to this, referring to FIG. 3, the floating setpoint secondary controller 22 of FIG. 1, operating in combination with secondary devices $D_5$, $D_6$ and $D_7$ (item 24) is arranged to provide a control gradient $\delta \overline{F}/\delta X_2$, having a significantly lower value than that of the primary controller 12.

Discussing the merits of such an arrangement, it will be seen that with required variations in total control effort being effected through the secondary devices $D_5$, $D_6$, $D_7$ the effect of their providing relatively smaller individual control effort components correspondingly reduces the size of requisite switching and control components. Additionally, the lower value of the control characteristic gradient permits greater accuracy of control.

In operation, the secondary floating setpoint controller 22 is responsive only to the variable components of the output signal from the conventional primary controller 12, so that control devices 24 contribute only towards supplying the fluctuating components of the overall required control effort, while control devices 14 contribute the more or less fixed base component of total control effort. The average slopes of the respective control diagrams FIG. 2 and FIG. 3 define a coarse control effort by the primary controller 12 and a fine control effort by the secondary controller 24.

The arrangement of upper and lower limits on the output $X_2$ of the secondary controller 22 is such that in Equation (1) above, the 1/S portion of the equation is rendered constant when $X_2$ is less than $L_1$ or when $X_2$ is greater than $L_2$, effectively arresting the integrating action of the secondary controller 22, so that the transfer function of controller 22 remains in accordance with Equation (1) regardless of the base level of the output signal $X_1$ from the primary controller 12.

The further requirements in the arrangements of the secondary controller 24 are as follows:

Firstly, its gain as represented by $K_1$ of the above Equation 1 should be such that the full span of the secondary control devices is traversed in response to a given change in the output $X_1$ from the primary controller 12 where the given change is somewhat less than that which corresponds to the switching span for any one of the primary control devices 14. Another way of expressing this requirement is that the gain $K_1$ should be such that the product of $K_1$ and the gradient $\delta \overline{F}/\delta X_2$ exceeds the gradient $\delta \overline{F}/\delta X_1$.

Secondly, the integrating limits $L_1$ and $L_2$ on the output $X_2$ of the secondary controller should be set so that the resulting range of $X_2$ is just sufficient to ensure that all of the secondary control devices 24 will responsive to $X_2$ in both the ON and OFF directions; that is, referring to FIG. 3, the value $L_1$ should be set to limit $X_2$ to a value just below that which would cause the device $D_5$ to switch OFF, while $L_2$ should be set to limit $X_2$ to a value just above that which would cause device $D_7$ to switch ON.

Thirdly, the total control effort from the secondary control devices 24 should be somewhat greater (e.g. 20% greater) than the maximum control effort for any one primary control device 14.

Figure 4:
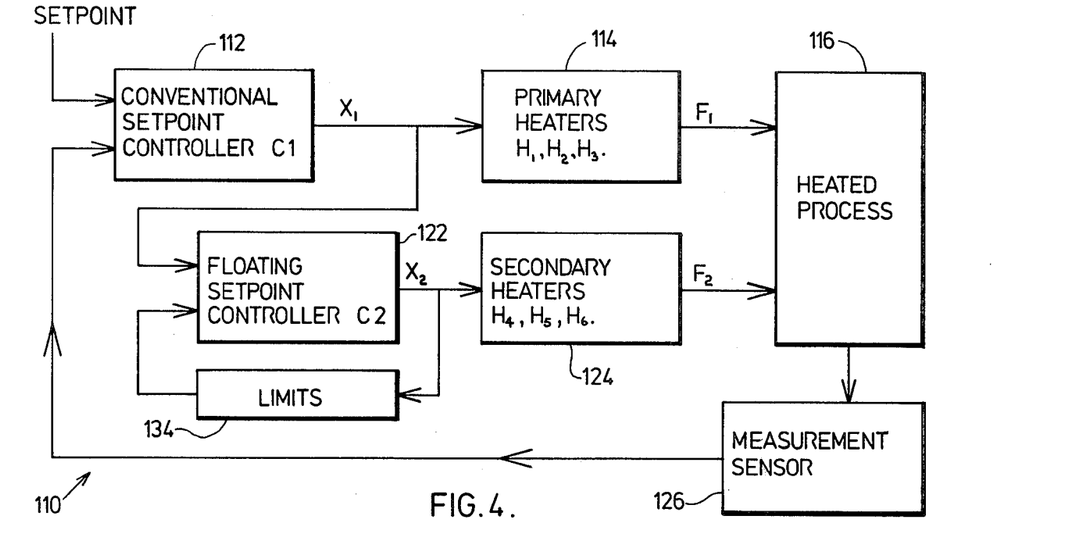
FIG. 4 corresponds to FIG. 1, showing a heating control circuit.

Referring now to FIGS. 4–8, which represent the particularization of the invention in a heating function embodiment, in FIG. 4, the system 110 is provided with a primary conventional setpoint controller 112, connected in control of a primary group of heaters 114, comprising heaters $H_1$, $H_2$ and $H_3$.

A secondary floating setpoint controller 122 is connected in control of a secondary set of heaters 124 comprising heaters $H_4$, $H_5$ and $H_6$. The output of the heated process 116 is monitored by measurement sensor 126 (i.e. probably a temperature sensor).

Figure 5:
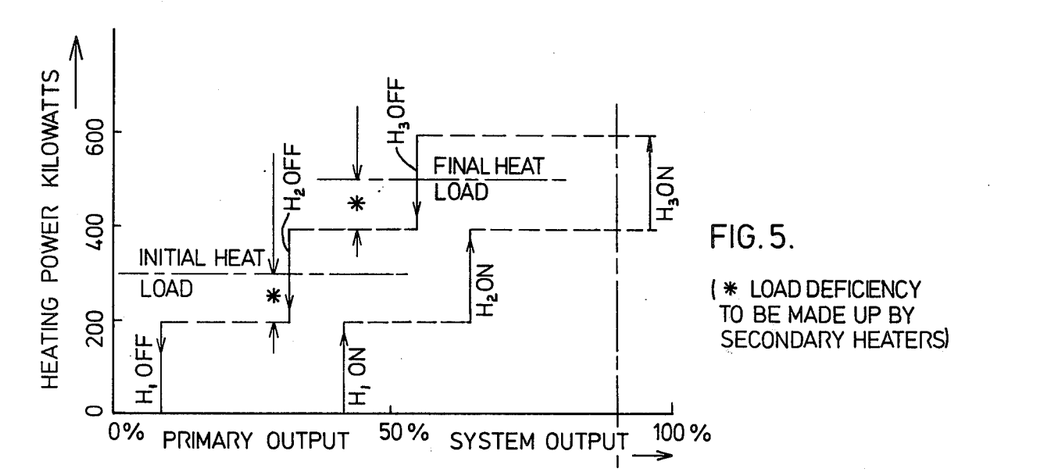
FIG. 5 corresponds to FIG. 2 showing the characteristic control effort diagram for the conventional portion of the system of FIG. 4.
Figure 7:
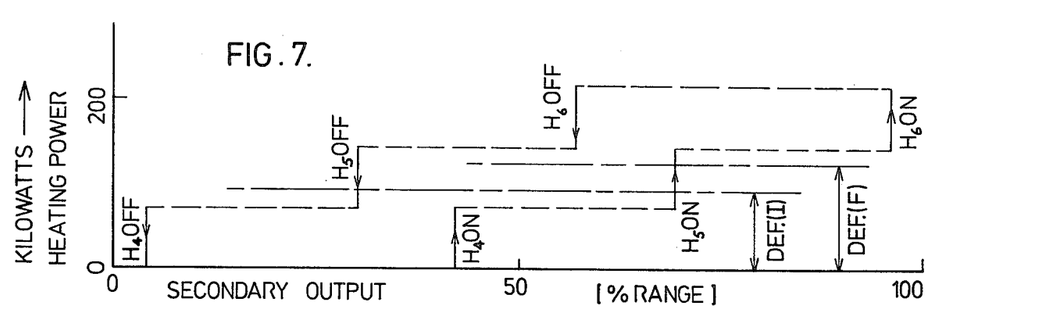
FIG. 7 is a characteristic control effort diagram for the innovative portion of the heating system of FIG. 4, for the secondary floating setpoint controller, and corresponds to FIG. 3.

The respective performance envelope of the characteristic control diagram of the conventional setpoint primary controller 112 and its heaters $H_1$, $H_2$ and $H_3$ in FIG. 5 is in contrast with the FIG. 7 characteristic for the floating setpoint secondary controller 122 and its heaters $H_4$, $H_5$ and $H_6$. This shows a corresponding relationship to that existing between FIGS. 2 and 3.

Figure 6:
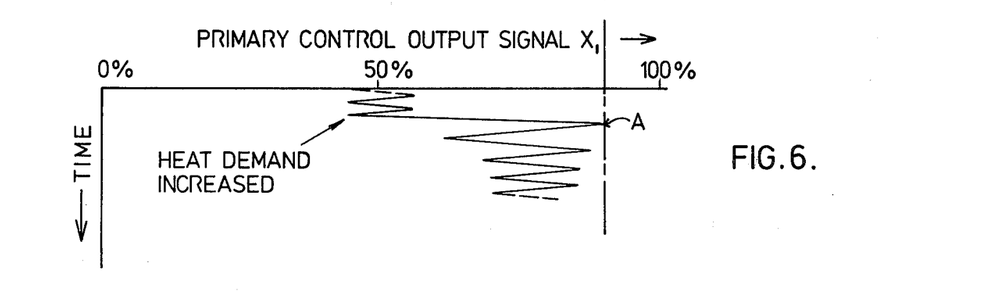
FIG. 6 is a Time-Response diagram for the conventional portion of the system of FIG. 4 with the primary controller of setpoint characteristic.
Figure 8:
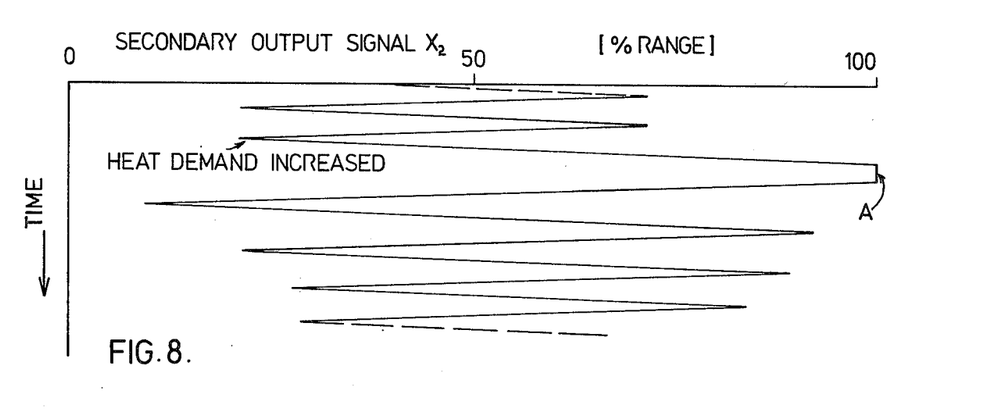
FIG. 8 is a Time-Response diagram for the innovative portion of the system of FIG. 4, showing the effect of the floating setpoint controller.

Referring to FIG. 6, the direct control function of primary controller 112 is illustrated as a function of time. Thus, using illustrative values, to achieve a 290 Kilowatts heating effort a primary component of 200 Kilowatts is provided by heater $H_1$ as shown by FIG. 5, this is supplemented by 70 Kilowatts from secondary heater $H_4$ and an average of 20 Kilowatts from cyclic on-off operation of secondary heater $H_5$ as indicated by FIGS. 7 and 8. Upon increase of the heating demand for example to 520 Kilowatts, heater $H_2$ is switched on by controller 112, and heaters $H_5$ and $H_6$ are switched on by controller 122 responding to the output signal $X_1$ from controller 112; the subsequent amplitude of oscillation of the heating demand varies in accordance with the stability of the overall system 110 and with the size of the secondary heaters 124.

Referring to FIG. 8, the operation of the secondary controller 122 together with its limits 134 is illustrated as a function of time as it responds to the output $X_1$ from the primary controller 112. When the control signal $X_1$ demands a large increase in heating, the output $X_2$ from the secondary floating setpoint controller 122 increases until such time as all of the secondary heaters 124 (identified in FIG. 4 as $H_4$, $H_5$, and $H_6$) are switch on, and the secondary controller becomes saturated. At the same time, the demand of the primary controller 112 continues to act upon the primary heaters $H_1$, $H_2$ and $H_3$, causing them to be appropriately switched on or off.

When the total heat output from the secondary heaters $H_4$, $H_5$ and $H_6$ plus the appropriate number of primary heaters $H_1$, $H_2$ and $H_3$ exceeds the total heating requirement, the primary controller 112 responds by reversing the direction of change of its output signal $X_1$ as shown at time "A" of FIG. 6. The secondary controller 122 responds to the reversal of $X_1$ by similarly reversing the direction in which its output signal $X_2$ tends to change; consequently the secondary controller becomes unsaturated immediately or shortly after time "A" as illustrated by FIG. 8. As the output signal $X_2$ from the secondary controller 122 decreases in response to the output signal $X_1$ from the primary controller 112, the secondary heaters are successively switched off until the total heating drops below the amount required by the process 116; the deficiency in heating is sensed by sensor 126, whereupon the primary controller and thereupon for secondary controller reverse the direction of change of their output signals $X_1$ and $X_2$ respectively, with the result that one or more of the secondary heaters 124 is switched on again until excessive heating occurs which again then reverses the direction of change of the controller signals $X_1$ and $X_2$. This cyclic pattern continues, with the amplitudes of $X_1$ and $X_2$ approaching a steady value in a manner determined by the stability characteristics of the overall system 110. In the ensuring quasi-steady-state, the output signals $X_1$ and $X_2$ from primary and secondary controllers 112 and 122 respectively will continue cycling with amplitudes sufficient to cause only the appropriate one of the secondary heaters to cycle on and off, and will acquire average values such that the average heating from the cycling secondary heater together with those primary heaters that are in the "on" state will match the amount of heat required by the process 116, for example 520 Kilowatts in the example illustrated by FIGS. 5-8.

Thus, by providing a secondary controller having a saturable response characteristic, with a primary controller connected thereto in controlling relation with the secondary controller and with one or more primary control devices, the system effects coarse regulation of the primary control effort for changes in control effort exceeding the limit of the secondary control devices, and less coarse regulation of a secondary control effort having the secondary controller connected in controlling relation therewith, when the required change in control effort is less than the control effort limit of the secondary control devices.

Referring to FIGS. 9-12, four embodiments of a secondary controller as herein disclosed are shown.

Figure 9:
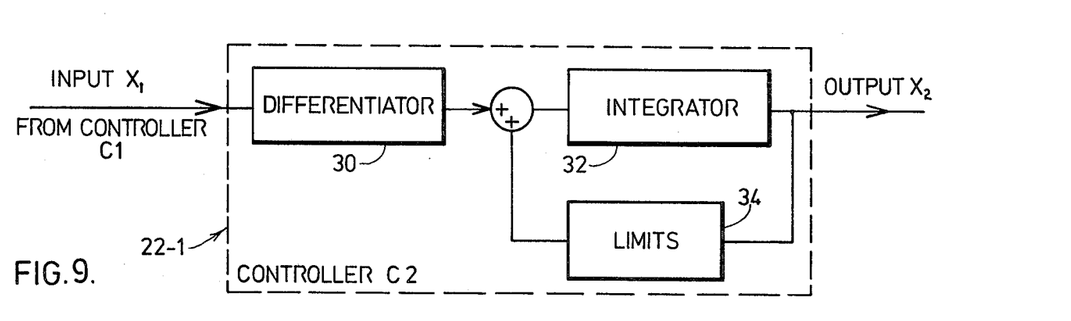
FIGS. 9–12 show certain embodiments of floating setpoint controllers.

In FIG. 9 the secondary controller 22-1 has a differentiator 30, an integrator 32, and limit means 34 to arrest the integrating function of integrator 32.

Differentiator 30 can comprise a conventional "rate" amplifier, and integrator 32 can comprise a conventional "reset" controller having feed back type limits for limit means 34.

Figure 10:
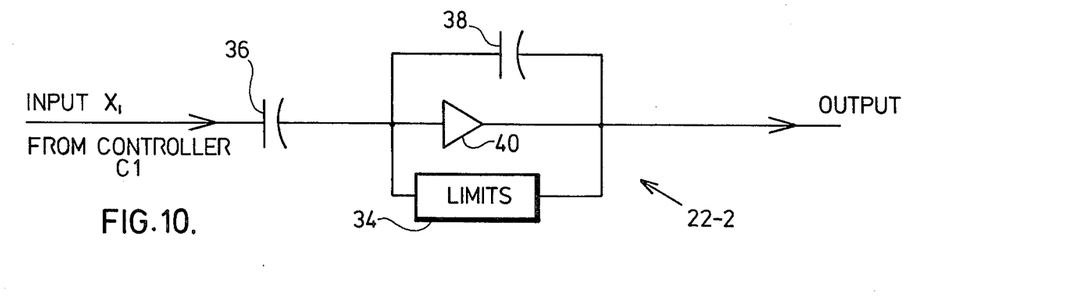

The secondary (floating setpoint) controller 22-2 of FIG. 10 utilizes a differentiating capacitor 36, an integrating capacitor 38 and an operation amplifier 40, all of which are well known elements and functions to those skilled in the art.

Figure 11:
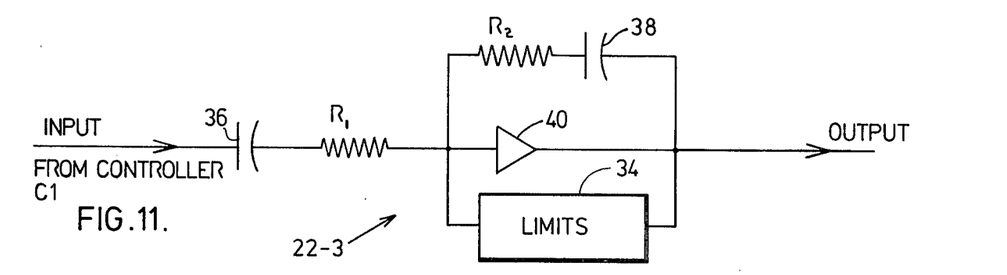

In the FIG. 11 embodiment impedances $R_1$ and $R_2$ are combined with the respective capacitors 36, 38 in order to limit high frequency noise which may comprise a component of the input signal $X_1$ from the primary controller 12 or 112 (FIGS. 1 and 4). The provision of such noise filters reduces degradation of the amplifier performance.

The relationship normally followed in this filter arrangement is that of making the product of capacitance and related resistance value substantially constant i.e. $R_1 * C_1 \simeq R_2 * C_2$.

Figure 12:
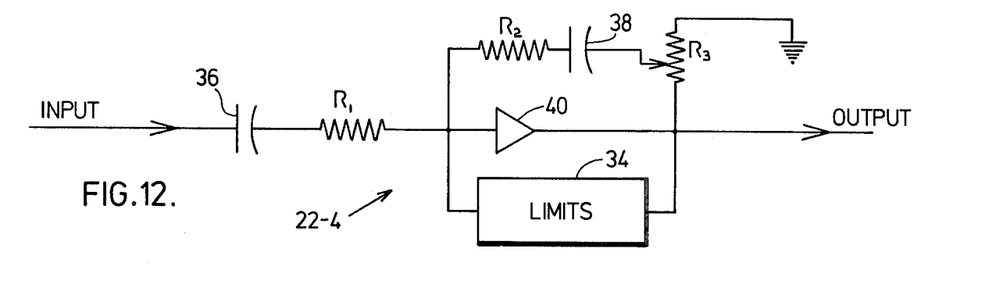

Referring to FIG. 12, the gain coefficient of the secondary controller can be adjusted by the provision of a potentiometer $R_3$, connected in potentiometric relationship with the capacitor 38.

Figure 13:
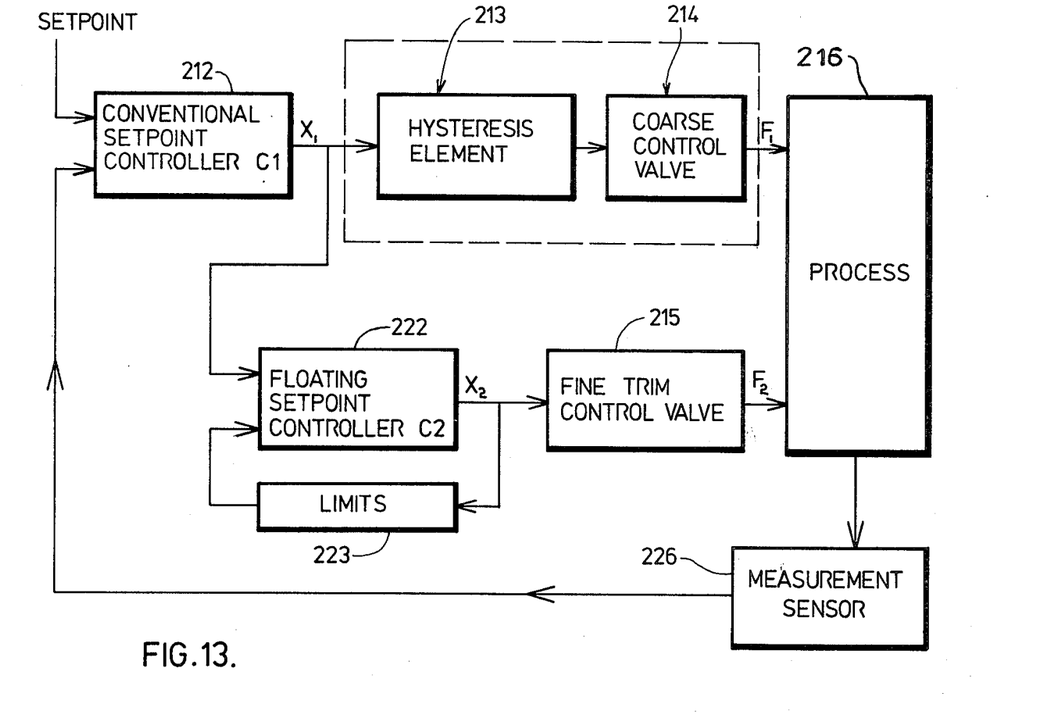
FIG. 13 is a schematic control circuit, similar to FIGS. 1 and 4, for a continuously variable control valve system.

Referring to FIG. 13, this embodiment illustrates a fluid flow control valve system having a large capacity or coarse control primary valve 214, and a relatively small capacity secondary valve 215 connected in parallel flow controlling relation with the primary valve 214. A hysteresis element 213 is provided to supplement the normal lost motion or backlash characteristics of the primary valve 214 and its actuating mechanisms by introducing synthetic hysteresis so that the total of sythetic hysteresis together with lost motion, or backlash, and the valve's stiction produces a prescribed magnitude of effective hysteresis. This prescribed magnitude of equivalent hysteresis would be typically 80 percent of the control effort span provided by the secondary valve 215.

The valve control circuit comprises a primary (conventional setpoint) controller 212, a secondary (floating setpoint) controller 222, an output sensor 226, and a feed back limiter 223, all connected in the fashion of the systemic diagram of FIG. 1, with the process 216.

Figure 14:
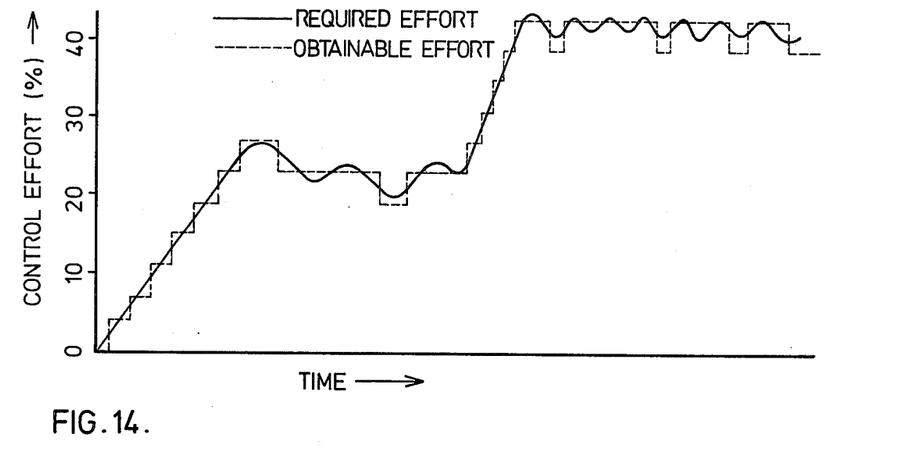
FIG. 14 is a characteristic control effort diagram for the FIG. 13 embodiment having the secondary floating setpoint controller disconnected.

FIG. 14 illustrates a characteristic regulation curve, with the required characteristics of actuation effort with time shown as a solid line, and the characteristic achieved by a coarse regulating valve subject to substantial stiction, but exclusive of hysteresis shown as a dotted line.

Figure 15:
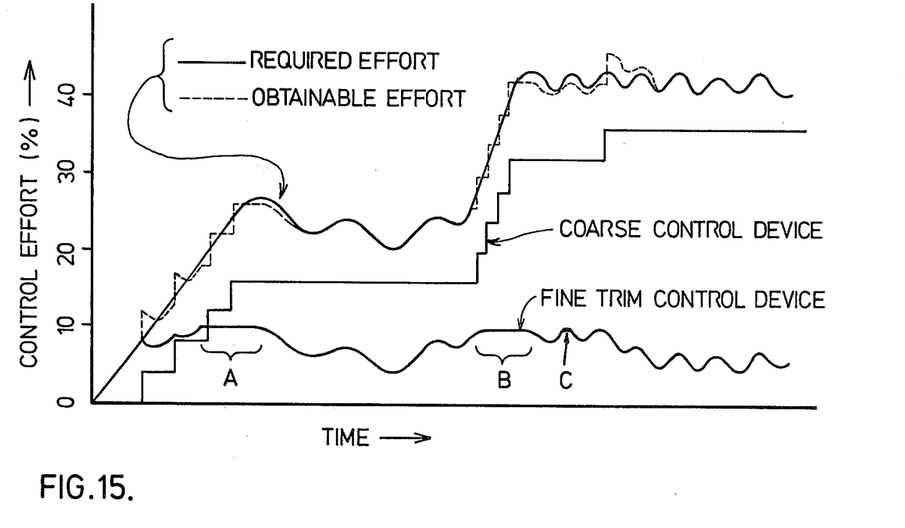
FIG. 15 is a characteristic control effort diagram for the FIG. 13 embodiment, showing the individual and combined effects of the respective primary and secondary controller circuits.

In the FIG. 15 chart, representing the performance of the FIG. 13 arrangement, the through-put of the fine trim control valve 215 is added to the through-put of the coarse control valve 214, to provide the aggregate output, shown by a dotted line, in relation to the desired characteristic. It will be seen that whenever the variations in required control effort fall within the control range of the fine trim valve 215 the correspondence between the required control characteristic and the control achieved is much closer than for the FIG. 14 characteristic.

As a basis of comparison, the FIG. 14 conventional characteristic is based upon a control device (valve 214) having an assumed stiction of 4% of the nominal maximum control effort. Accordingly, while the average value for control effort provided substantially equals the required control effort, the extent of actual correspondence is very limited, and system regulation may be considered so poor as to be unacceptable.

In FIG. 15 characteristic the effort provided by trim control 215 is assumed to be at the most 10% of the maximum value of the total control effort provided for the valve system.

The trim controller 222 provides all required regulating control effort, lying within the values of controller limits 223 and within the span of the effective hysteresis associated with the coarse control valve 214. The value of the effective hysteresis is based upon a stiction effect corresponding to 4% of the valve system's total control effort, plus 4% combined effect from the hysteresis element 213 and backlash in the primary valve's (214) actuating mechanisms; thus a total of 8% effective hysteresis is provided, as compared with the 10% control effort span of the fine trim control valve 215.

The secondary controller 222 possesses a saturation characteristic corresponding to that of the systems of FIGS. 1 and 4. Thus, referring to FIG. 15, the periods A, B and C represent the saturation condition of secondary controller 222, for which periods of time the output called for by the primary controller 212 lies outside the saturation limit of controller 222. Thus the primary controller 212 becomes effective in these periods of time to directly regulate the primary device valve 214 in the manner represented by the characteristic curve. From this can be seen the effects of the operation of self zero-shifting performance of the secondary controller 222.

It will be understood that the FIG. 13 embodiment can be obtained by adding-on the secondary fine trim control valve 215 and the associated floating setpoint controller 222 to an existing flow regulation system, in order to obtain the benefits of enhanced regulation without extensive change to the original system. However, it will be evident that the results of the addition are synergistic rather than aggregational.

The embodiments of the invention in which an exclusive property or privilege is claimed are defined as follows:

1. A method of controlling a system comprising a plurality of control devices by selective on-off switching in order to achieve a desired cumulative output variable within predetermined limits, while automatically selectively controlling the extent of said on-off switching, comprising the steps of providing a first output from a first plurality of said devices as a primary control effort, using a conventional setpoint primary controller; providing a second variable output from a second plurality of said devices connected effectively in parallel with said first devices; controlling the selection of on-off operation of said second devices by means of a floating setpoint secondary controller; providing a control input to said secondary controller from said first controller; sensing the effect of the cumulative output of said devices, and providing a controlling feed-back in response thereto as an input to said first controller.

2. The method as claimed in claim 1, including limiting the operation of said secondary controller within prescribed limits, whereby coarse regulation of said system is effected by said primary controller.

3. A device control system in combination with a plurality of function providing devices, including a primary controller connected in output controlling relation with at least one primary said device, a secondary controller connected in output controlling relation with at least one secondary said deivce, the outputs of said devices being connected in mutually cumulative relation as a useful output; signal means connecting said primary controller in controlling relation with said secondary controller; sensing means for sensing said useful outtput, connected in feed-back relation with said primary controller, limit means connected with said secondary controller to preclude operation thereof when the demand of said secondary controller exceeds predetermined limits, whereupon the primary controller effects regulation of a said primary device.

4. The system as claimed in claim 3, wherein said limit means comprise saturation feed-back means to limit the responsiveness of said secondary controller to a predetermined amount of change of control signal from said primary controller, whereby selective control over said secondary controller is effected.

5. The system as claimed in claim 3 wherein said devices are controlled in a bang-bang control manner.

6. The system as claimed in claim 3 wherein at least one said device is continuously controlled.

7. The system as claimed in claim 3 wherein said devices are heating devices.

8. The system as claimed in claim 3 wherein said devices are flow control devices.

9. A device control system for selectively controlling a plurality of function providing devices in an on-off operating mode in order to provide a close approximation to a desired cumulative output of said devices, comprising:

first control means consisting of a conventional setpoint controller having a control output connected in serial controlling relation with first device means consisting of at least one said device; second device means comprising a plurality of said devices, said first device means and said second device means being connected in mutual parallel relation; second control means consisting of a floating setpoint controller interposed between said first control means and said second device means in controlling relation with the latter; and output sensing means responsive to said cumulative output of said first and second device means having an output connected in feed-back relation with said first control means.

* * * * *